United States Patent
Cooper et al.

(10) Patent No.: US 11,072,297 B2
(45) Date of Patent: Jul. 27, 2021

(54) ALL-TERRAIN VEHICLE

(71) Applicant: Polaris Industries Inc., Medina, MN (US)

(72) Inventors: Robert D. Cooper, Andover, MN (US); Zachary R. Blackford, Harris, MN (US); Joel B. Kelso, Star Prairie, WI (US); Jason R. Fields, Oak Grove, MN (US); Craig C. Swanberg, Chisago City, MN (US)

(73) Assignee: Polaris Industries Inc., Medina, MN (US)

( * ) Notice: Subject to any disclaimer, the term of this patent is extended or adjusted under 35 U.S.C. 154(b) by 102 days.

(21) Appl. No.: 16/434,700

(22) Filed: Jun. 7, 2019

(65) Prior Publication Data

US 2020/0384932 A1   Dec. 10, 2020

(51) Int. Cl.
  *B60R 13/08*   (2006.01)
  *B60R 13/07*   (2006.01)
  *B62D 21/18*   (2006.01)

(52) U.S. Cl.
  CPC .......... *B60R 13/0861* (2013.01); *B60R 13/07* (2013.01); *B62D 21/183* (2013.01)

(58) Field of Classification Search
  CPC .... B60R 13/0861; B60R 13/07; B62D 21/183
  See application file for complete search history.

(56) References Cited

U.S. PATENT DOCUMENTS

| | | | |
|---|---|---|---|
| 7,270,207 B2 * | 9/2007 | Idei | F02M 35/10262 180/68.3 |
| 8,122,993 B2 | 2/2012 | Ripley | |
| 8,196,989 B2 * | 6/2012 | Yokoyama | B62K 11/04 296/66 |
| 8,267,034 B2 | 9/2012 | Whiting | |
| 8,430,442 B2 | 4/2013 | Utke | |
| 8,678,464 B2 | 3/2014 | Smith | |
| 8,776,923 B2 * | 7/2014 | Nakamura | B62J 35/00 180/68.1 |
| 8,905,435 B2 | 12/2014 | Ripley | |
| 2003/0057008 A1 | 3/2003 | Lai | |
| 2007/0261906 A1 | 11/2007 | Yao | |
| 2013/0248271 A1 | 9/2013 | Nakamura | |
| 2018/0201328 A1 * | 7/2018 | Hijikata | B62D 35/02 |

FOREIGN PATENT DOCUMENTS

| | | |
|---|---|---|
| DE | 9202228 | 4/1992 |
| EP | 1790559 | 5/2007 |

OTHER PUBLICATIONS

International Search Report and Written Opinion issued by the International Searching Authority, dated Aug. 26, 2020, for International Patent Application No. PCT/US2020/034069; 14 pages.

* cited by examiner

Primary Examiner — Drew J Brown
(74) Attorney, Agent, or Firm — Faegre Drinker Biddle & Reath LLP (57) ABSTRACT

An off-road vehicle having a frame, a plurality of ground engaging members operably coupled to the frame, a seat supported by the frame and configured to support an operator, an engine supported by the frame, a body supported by the frame, and a liner coupled to the body, where the liner is configured to be positioned between the body and a heat source of the off-road vehicle, and an air gap extends between the liner and the body.

27 Claims, 12 Drawing Sheets

ALL-TERRAIN VEHICLE

FIELD OF THE DISCLOSURE

The present disclosure relates to an all-terrain vehicle and, more particularly, to a mechanism for providing reduced temperatures along an upper surface of a body portion of an all-terrain vehicle.

BACKGROUND AND SUMMARY OF THE DISCLOSURE

Generally, all-terrain vehicles ("ATVs") and utility vehicles ("UVs") are used to carry at least one person over a variety of terrains. For example, the ATVs and UVs are configured to traverse dry dirt trails, paved roads, and wet trails.

However, due to the proximity of the exhaust or other heat sources of the vehicles to the rider area, various areas in the rider area of an ATV or UV have upper surfaces of the body that can become hot when the ATV or UV is running. Because these areas are typically adjacent to or within the rider area, they are known as high heat touch points. One example is the area of the body proximate the rear of the seat of an ATV. Therefore, for the comfort of the rider, a need exists for an ATV or UV with reduced temperatures at the upper surfaces of the various portions of the body of the ATV or UV adjacent to or within the rider area.

SUMMARY OF THE DISCLOSURE

According to an illustrative embodiment of the present disclosure, an all-terrain vehicle ("ATV") comprises a frame, a plurality of ground engaging members operably coupled to the frame, a seat supported by the frame and configured to support an operator, an engine supported by the frame, a body supported by the frame, and a liner coupled to the body, the liner configured to be positioned between the body and a heat source of the ATV, wherein an air gap extends between the liner and the body.

According to another illustrative embodiment of the present disclosure, a vehicle comprises a frame, a plurality of ground engaging members operably coupled to the frame, an operator seat supported by the frame, the operator seat configured to support at least one user, an engine supported by the frame, and a body supported by the frame, the body having a first portion and a second portion, the first portion being spaced apart from the second portion in a configuration defining an air gap between the first portion and the second portion, the first portion defining a portion of an outer surface of the body.

BRIEF DESCRIPTION OF THE DRAWINGS

The above mentioned and other features of this disclosure, and the manner of attaining them, will become more apparent and the disclosure itself will be better understood by reference to the following description of embodiments of the invention taken in conjunction with the accompanying drawings, where.

Corresponding reference characters indicate corresponding parts throughout the several views. The drawings represent embodiments of the present disclosure and the features of the drawings are shown to scale.

DETAILED DESCRIPTION OF THE DRAWINGS

The embodiments disclosed below are not intended to be exhaustive or to limit the disclosure to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as other all-terrain vehicles, utility vehicles, motorcycles, snowmobiles, and golf carts.

Figure 1:
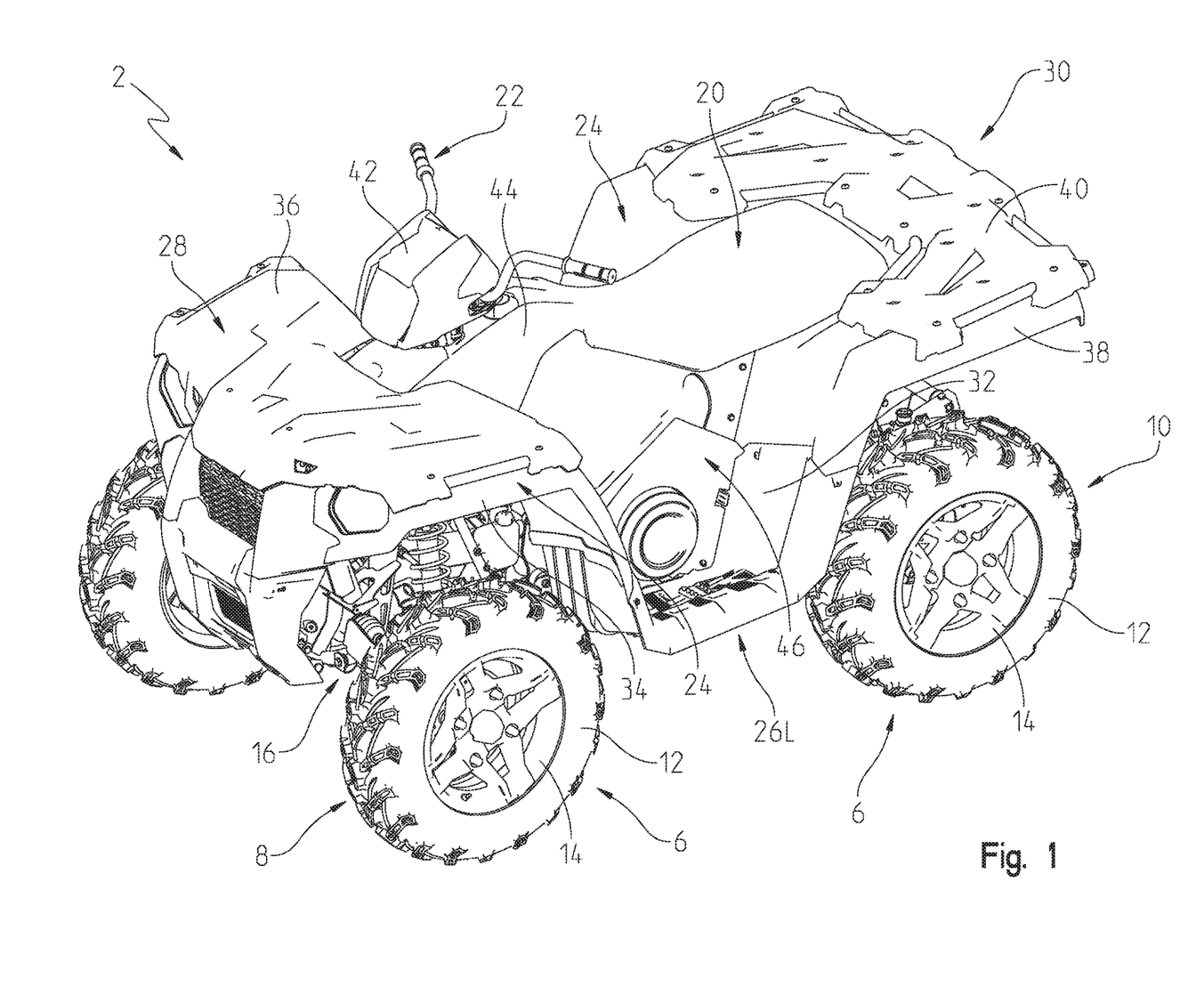
FIG. 1 is a left front perspective view of an all-terrain vehicle of the present disclosure.
Figure 2:
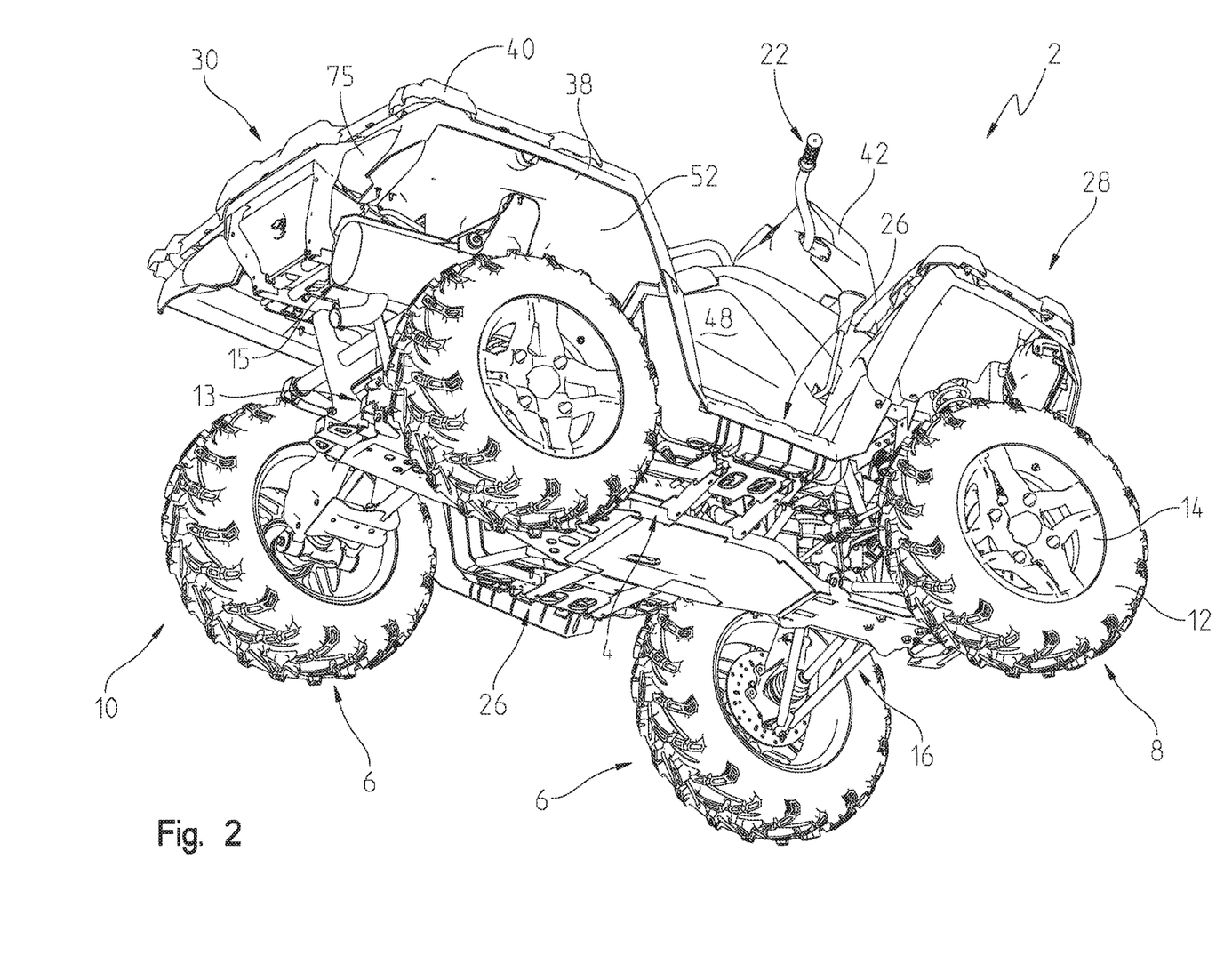
FIG. 2 is a right rear perspective view of the vehicle of FIG. 1.
Figure 3:
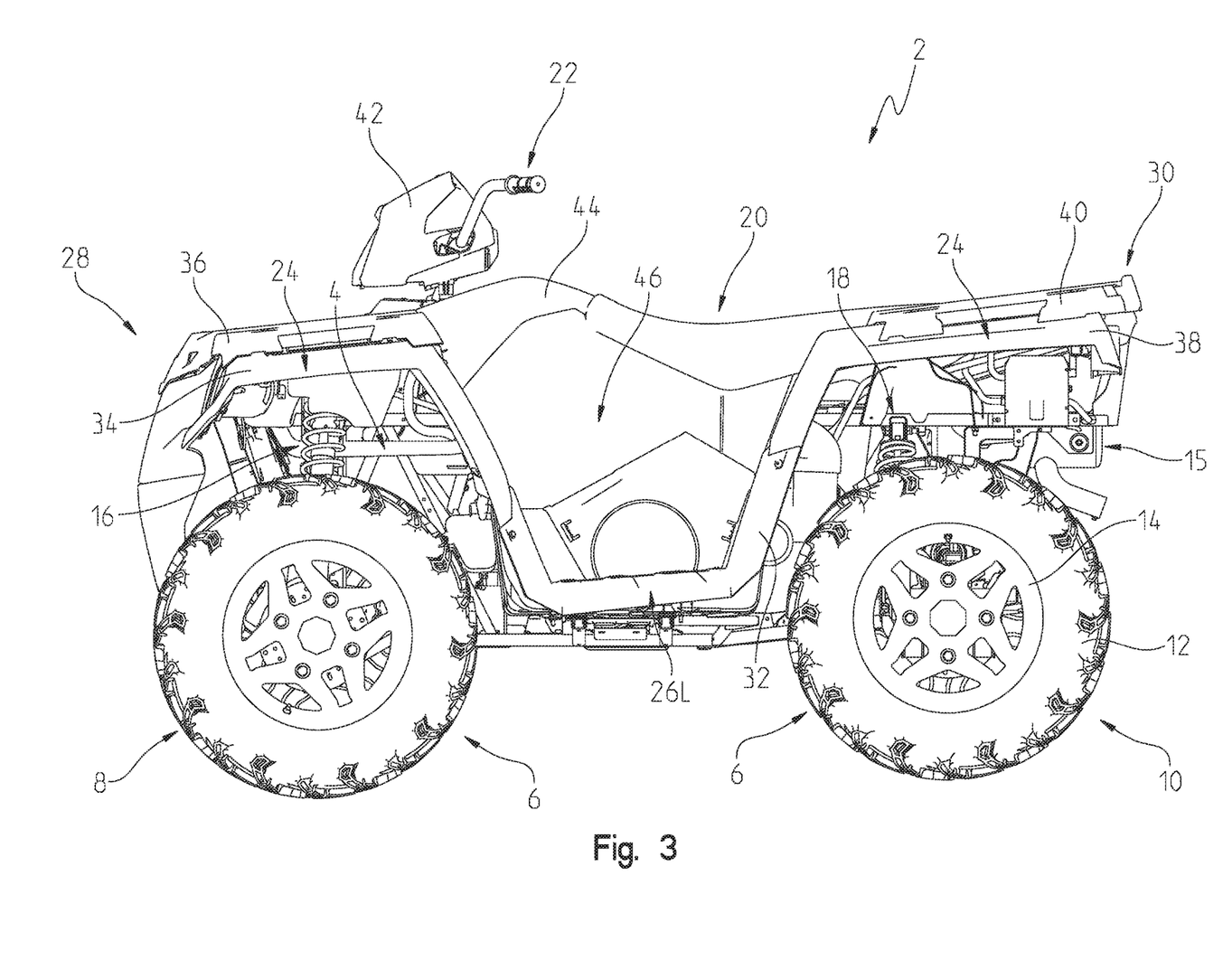
FIG. 3 is a left side view of the vehicle of FIG. 1.
Figure 4:
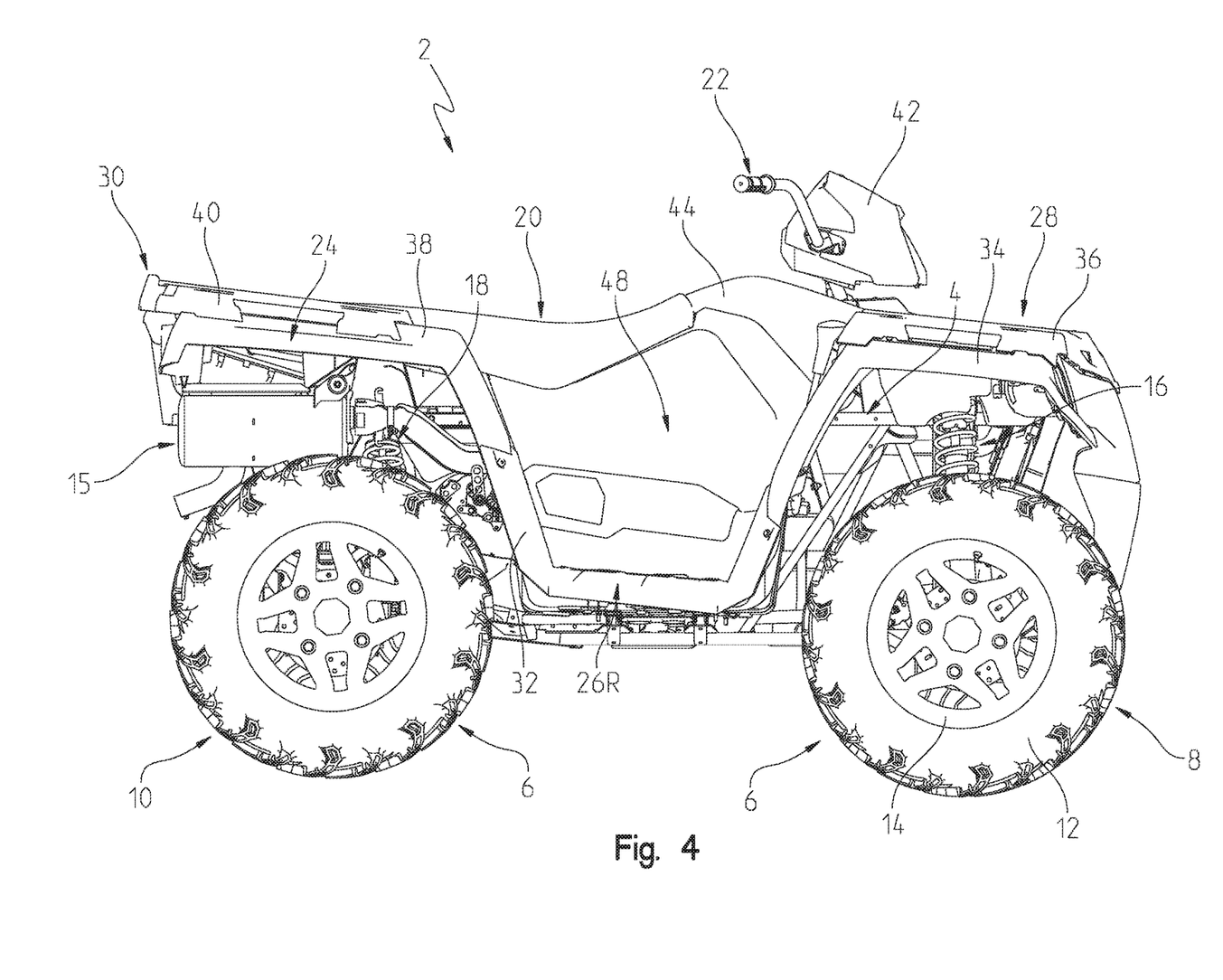
FIG. 4 is a right side view of the vehicle of FIG. 1.

Referring to FIGS. 1-4, an illustrative embodiment of an all-terrain vehicle ("ATV") 2 is shown. ATV 2 includes a frame 4 coupled to and supported by a plurality of ground-engaging members 6, illustratively front wheels 8 and rear wheels 10. Front and rear wheels 8, 10 comprise tires 12 and rims 14. ATV 2 generally also includes a powertrain 13 having an engine (not shown) and an exhaust 15. Exhaust 15 is generally positioned at a rear of ATV 2 along a ride side thereof and, more particularly, portions of exhaust 15 (e.g., a muffler) are at least partially rearward of a seat assembly 20. Front wheels 8 are coupled to frame 4 by way of a front suspension 16, and rear wheels 10 are coupled to frame 4 by way of a rear suspension 18. ATV 2 further includes seat assembly 20, which as shown in FIGS. 1 and 2 can be for a single rider or two riders. For example, ATV 2 could accommodate two riders as described in U.S. Pat. Nos. 8,678,464 or 8,430,442, the subject matter of both patents is incorporated herein by reference. ATV 2 also includes a steering assembly 22 for steering at least the front wheels 8 as is known in the art. Steering assembly 22 could be similar to that described in U.S. Pat. No. 8,122,993, the subject matter of which is incorporated herein by reference.

ATV 2 also includes an outer body 24, generally formed of a plastic material. Outer body 24 may include a front assembly 28 provided forward of steering assembly 22, a rear cab 30 provided rearward of seat 20, and foot wells or pedestals 26 for accommodating a rider's feet and legs while riding, where a left foot pedestal is referred to as 26L and a right foot pedestal is referred to as 26R. Each of left and right foot pedestals 26 includes a rear fender body portion 32 at a rear of the pedestal 26.

Front assembly 28 generally includes a body portion 34, such as at least one hood panel, and a rack 36, where rack 36 is coupled to an upper surface of body portion 34. It should be appreciated that front assembly 28 could include a plurality of tie downs and/or could include a moveable portion to expose a storage cavity for storing items while riding. Rear cab 30 generally includes a body portion 38 and a rack 40, where rack 40 is coupled to an upper surface of body portion 38. It should also be appreciated that rear cab 30 could include integrated tie down portions such as those described in U.S. Pat. No. 8,905,435, the subject matter of which is incorporated herein by reference. Front assembly 28 and/or rear cab 30 could also include apertures for receiving an expansion member similar to that shown and/or described in U.S. Pat. No. 8,267,034, the subject matter of which is incorporated herein by reference. Outer body 24 may also include light pod 42, center console 44, left side-panel 46, and right side-panel 48.

Figure 5:
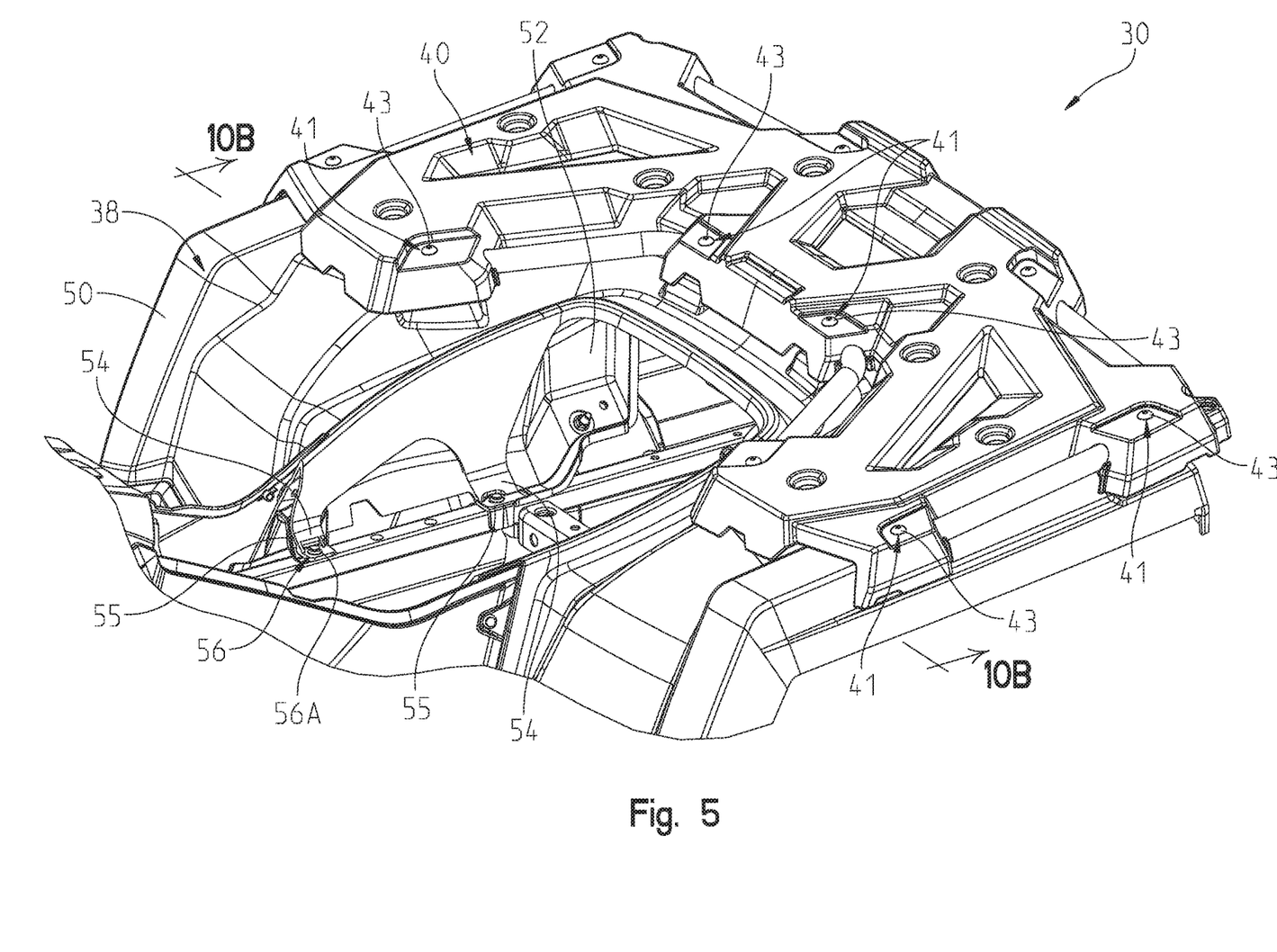
FIG. 5 is a left front perspective view of a rear cab of the vehicle of FIG. 1 with a seat of the vehicle removed.

With reference now to FIGS. 5-12, rear cab 30 will be described in greater detail. With reference to FIG. 5, rear cab 30 includes body portion 38 and rack 40, and may further include a liner 52 positioned below body portion 38 and rack 40. Body portion 38 of rear cab 30 extends around the rear end of seat 20 and is configured to couple to rear fender body portions 32 (FIG. 6) on either side of ATV 2 and to frame 4 of ATV 2. In various embodiments, body portion 38 includes a main body 50 and a plurality of forward tabs 54 and side tabs 39. Main body 50 of body portion 38 is configured to couple to apertures 33 of fender body portions 32 (see FIGS. 7, 8, 11 and 12) through side tabs 39 of main body 50 (see FIG. 8), and forward tabs 54. More particularly, forward tabs 54 include apertures 56 configured to receive a coupler 56a (FIG. 5), which are configured to couple to frame 4 below seat 20. In various embodiments, body portion 38 further includes apertures 57 (see FIG. 8) configured to receive couplers 43 for coupling rack 40 to body portion 38 through at least openings 41 (FIG. 5) in coupling rack 40. In other various embodiments, body portion 38 may be coupled to fender body portions 32 via rivet couplings and/or u-nuts.

Still referring to FIGS. 5-12, liner 52 of rear cab 30 includes a body 53 and a plurality of tabs 55, and body 53 of liner 52 has a front portion 60, a rear portion 62, an outer portion 64, and an inner portion 66. Tabs 55 are generally coupled to inner portion 66 of body 53. In various embodiments, liner 52 is configured to couple to a bottom surface 58 (see FIG. 8) of body portion 38 along a right side of rear cab 30 and to fender body portions 32 on the right side of ATV 2 such that liner 52 is positioned between body portion 38 and exhaust 15. Front portion 60 of liner 52 is coupled with body portion 38 and/or fender body portions 32 via tongue and grove coupling(s) 67 that include tongues 65 and grooves 69 (see FIGS. 11 and 12). Body 53 of liner 52 couples to body portion 38 through apertures 59 of liner 52 which align with apertures 57 of body portion 38. Apertures 57 are already provided for coupling body portion 38 to rack 40, and thus in various embodiments, liner 52 and rack 40 are coupled to body portion 38 through the same apertures 57. However, in various embodiments, liner 52 may be coupled to body portion 38 through separate apertures such that rack 40 is coupled to body portion 38 through apertures 57, while liner 52 is coupled to body portion 38 through other apertures separate and spaced apart from apertures 57. In still yet other various embodiments, liner 52 may be coupled to body portion 38 through some of apertures 57 and some other apertures spaced apart from apertures 57. In some embodiments, liner 52 and body portion 38 may instead be formed of a single, unitary piece.

Figure 6:
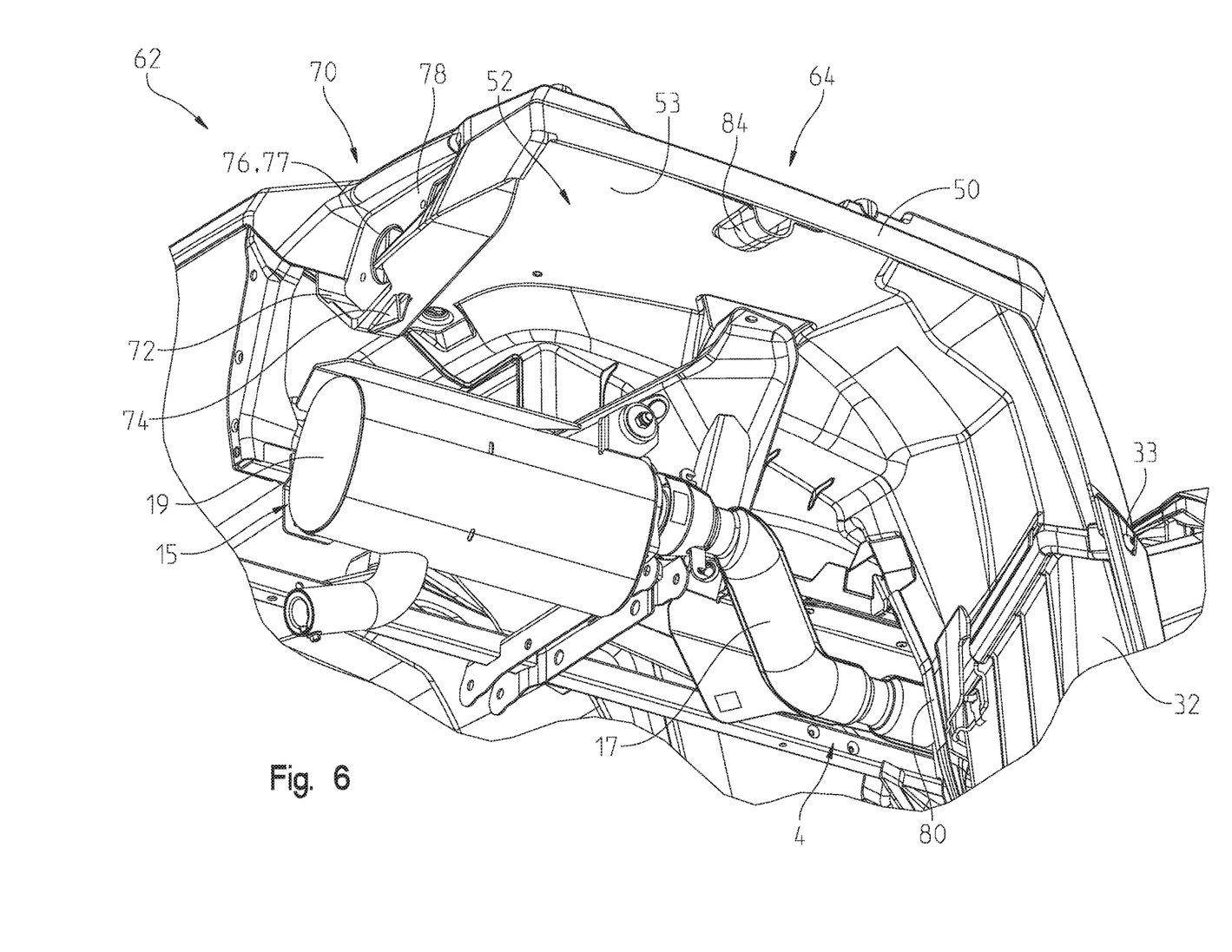
FIG. 6 is a detailed bottom right perspective view of the rear cab of FIG. 5 showing a liner and a body portion of the rear cab and an exhaust of the vehicle of FIG. 1.
Figure 7:
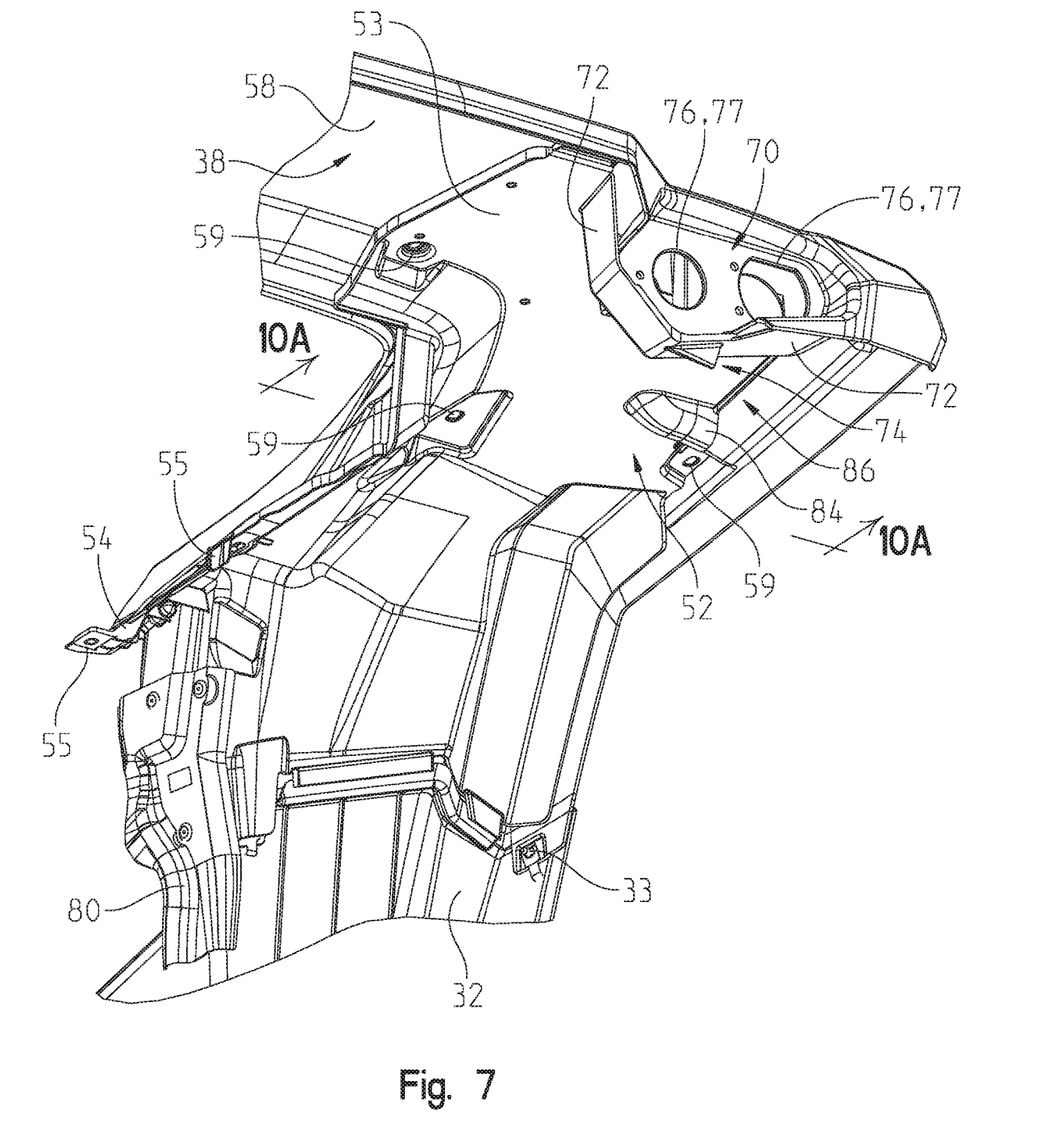
FIG. 7 is a detailed bottom perspective view of the liner and the body portion of FIG. 6 coupled a heat shield and a fender body portion of the vehicle of FIG. 1.
Figure 8:
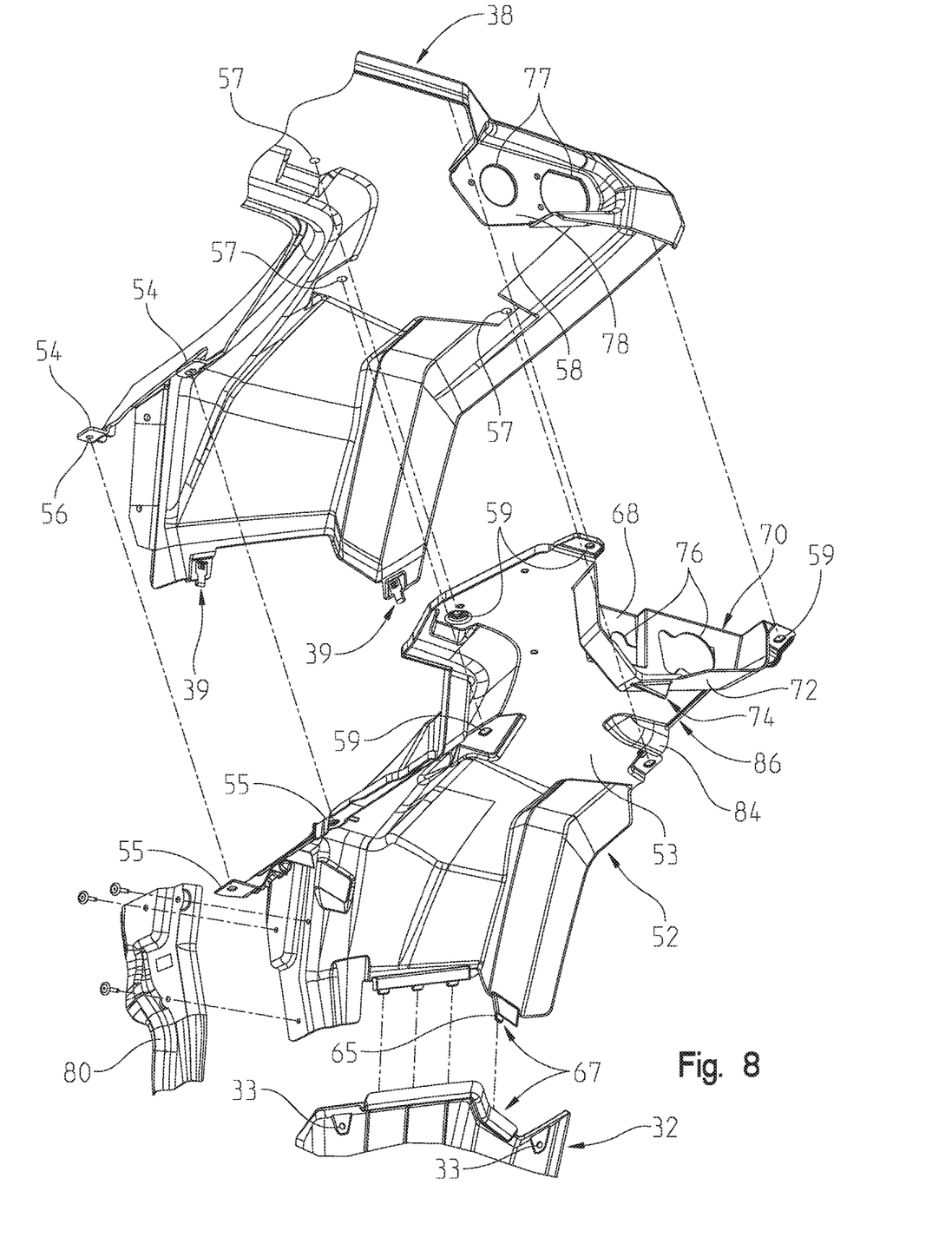
FIG. 8 is an exploded view of the liner, the body portion, the heat shield, and the fender body portion of FIG. 7.
Figure 9:
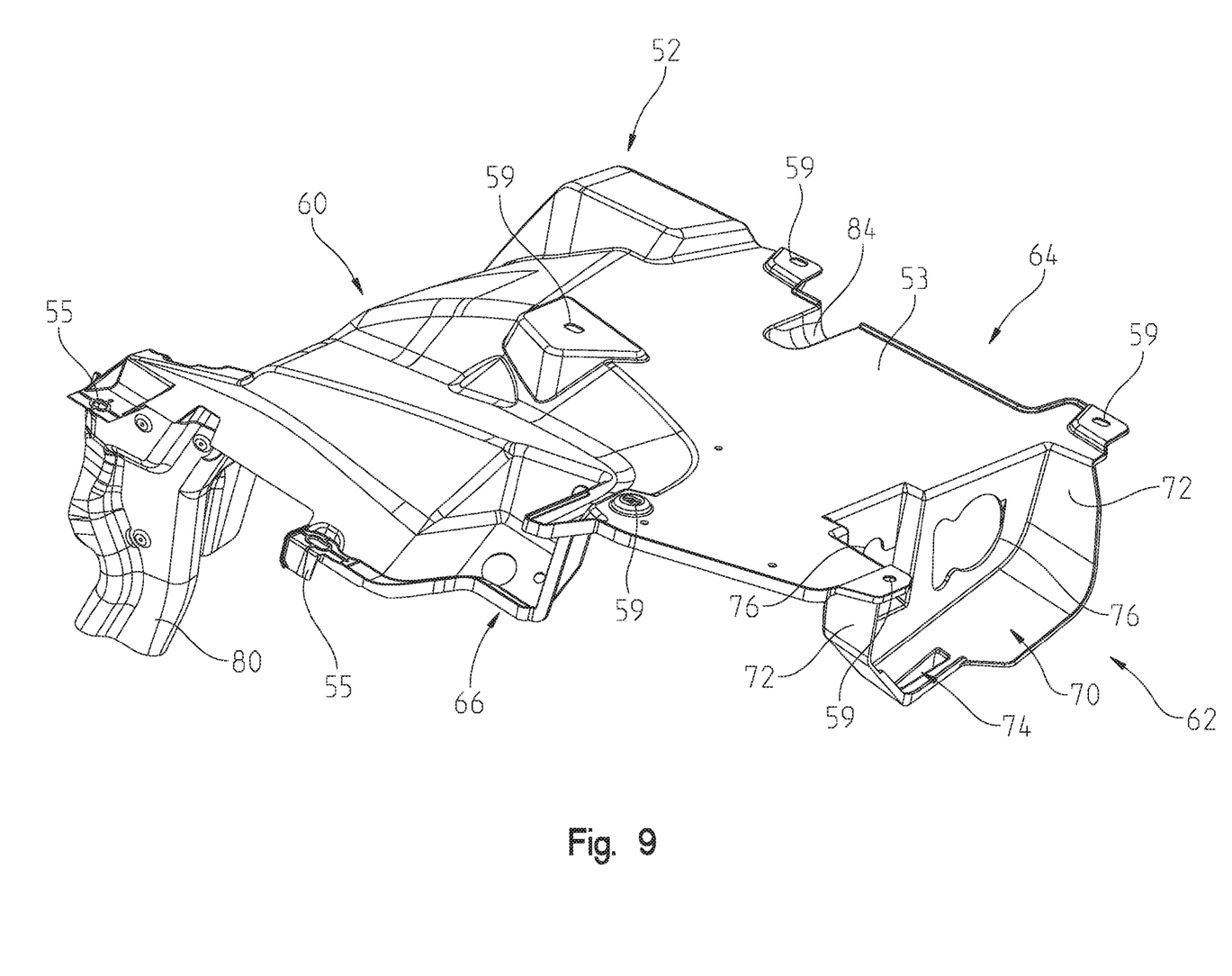
FIG. 9 is a perspective view of the liner of FIG. 6.

Referring to FIGS. 5-7, tabs 55 of liner 52 are configured to couple to frame 4 below tabs 54 of body portion 38 such that tabs 55 of liner 52 are positioned between frame 4 and tabs 54 of body portion 38. In various embodiments, liner 52 and at least a portion of body portion 38 adjacent thereto are both positioned adjacent exhaust 15. In an exemplary embodiment, liner 52 and at least a portion of body portion 38 are positioned directly above exhaust 15.

With reference to FIGS. 6-10, liner 52 may further include a downwardly extending portion 68 and a drip shield 70 along rear portion 62 of liner 52. In various embodiments, drip shield 70 and/or portion 68 may extend beyond rear portion 62 to outer or inner portions 64, 66. Drip shield 70 generally includes flanges 72 that, when liner 52 is coupled to body portion 38, route any liquid or debris flowing along body portion 38 and/or liner 52 away from exhaust 15 and/or a silencer (not shown) of ATV 2, and a spout 74 for allowing the liquid or debris to leave drip shield 70 where the liquid and debris are directed away from exhaust 15 and/or the silencer. Flanges 72 of drip shield 70 generally extend rearwardly from and around openings 76 of portion 68, which are configured to receive a portion of a tail light 75 of ATV 2 (see FIG. 2). In various embodiments, body portion 38 includes a downwardly extending portion 78 configured to be received between flanges 76 of drip shield 70 in abutment with or in close proximity to portion 68 such that any liquid or debris flowing off body portion 38 may flow within flanges 76 and off of ATV 2 through spout 74. Downwardly extending portion 78 may also include openings 77 for receiving a portion of tail light 75, where openings 77 are configured to be positioned in alignment with openings 76 of portion 68 such that the same portion of tail light 75 may pass through both openings 76, 77. As such, at least a portion of tail light 75 of ATV 2 is encased by portion 68 and drip shield 70 such that tail light 75 is protected from heat produced by exhaust 15 because of body portion 38 and liner 52.

Referring to FIGS. 6-9, in various embodiments, a heat shield 80 may be coupled to liner 52 to provide an additional thermal barrier between the rider(s) of ATV 2 and exhaust 15. As shown in FIG. 6, heat shield 80 may be provided between liner 52 and a conduit 17 provided between a muffler 19 of exhaust 15 and the engine of ATV 2. Heat shield 80 may be coupled to liner 52 in a variety of fashions, for example, heat shield 80 may be welded to liner 52 and/or fastened to liner 52 with fasteners, (i.e., rivets, nuts and bolts, etc.). In various embodiments, liner 52 and heat shield 80 may be formed as a single unitary piece. Heat shield 80 may be made of the same material as liner 52, or heat shield 80 may be made of a different material having different thermal qualities than the material of liner 52.

Figure 10A:
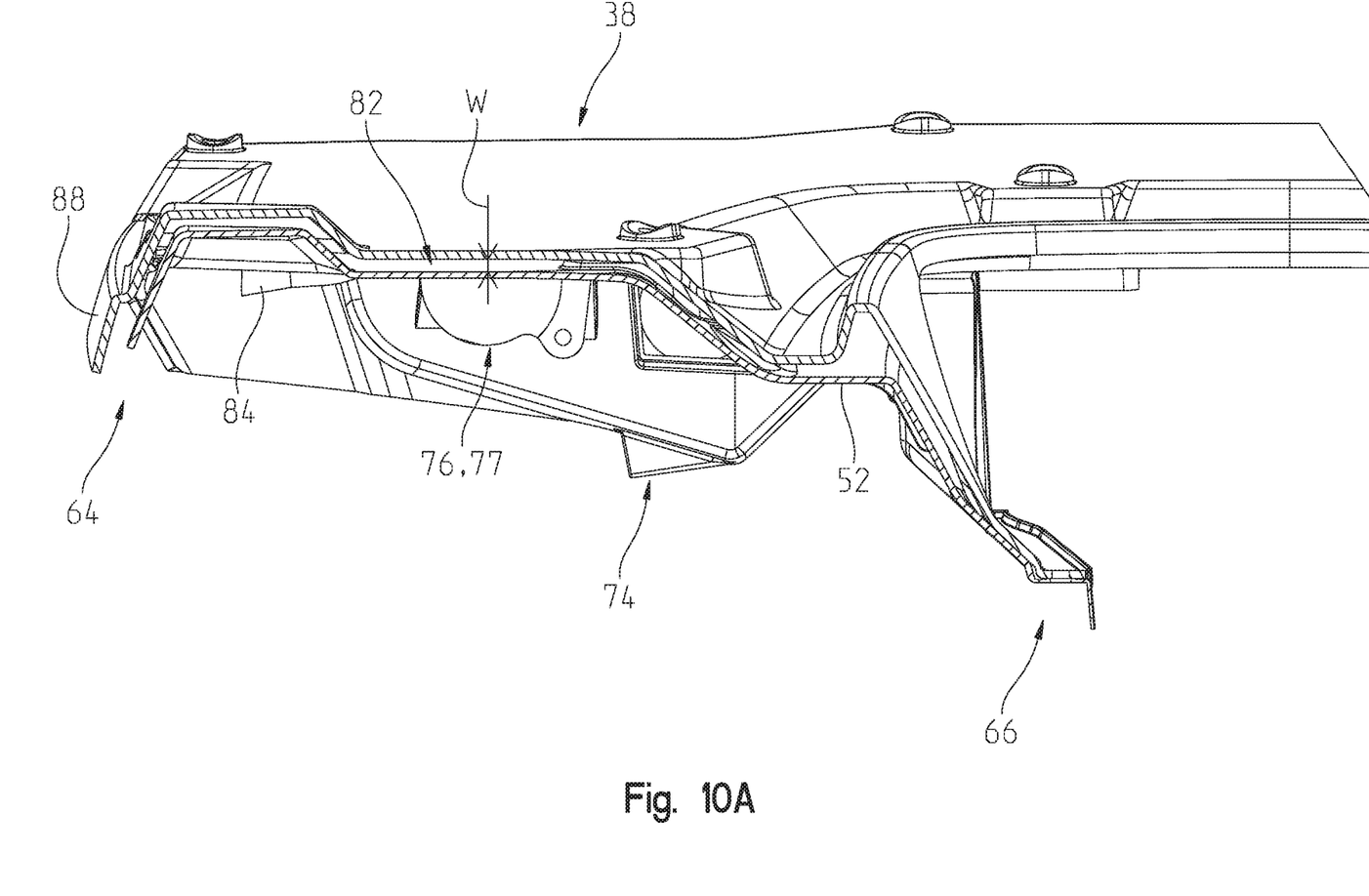
FIG. 10A is a cross-sectional view of the liner and the body portion of FIG. 7, taken along line 10A-10A of FIG. 7.
Figure 10B:
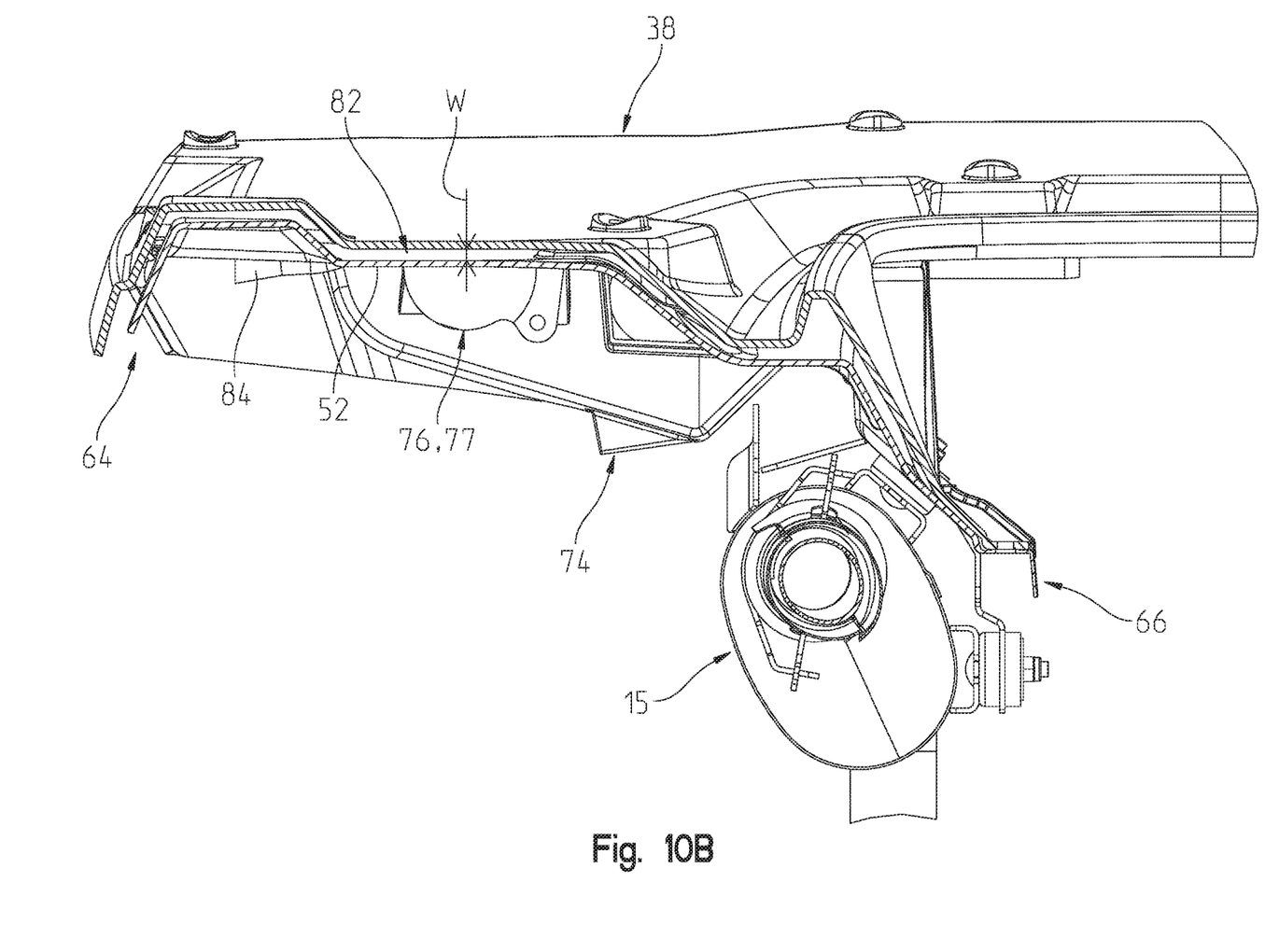
FIG. 10B is a cross-sectional view of the liner, the body portion and the exhaust of FIG. 6, taken along line 10B-10B of FIG. 5.
Figure 11:
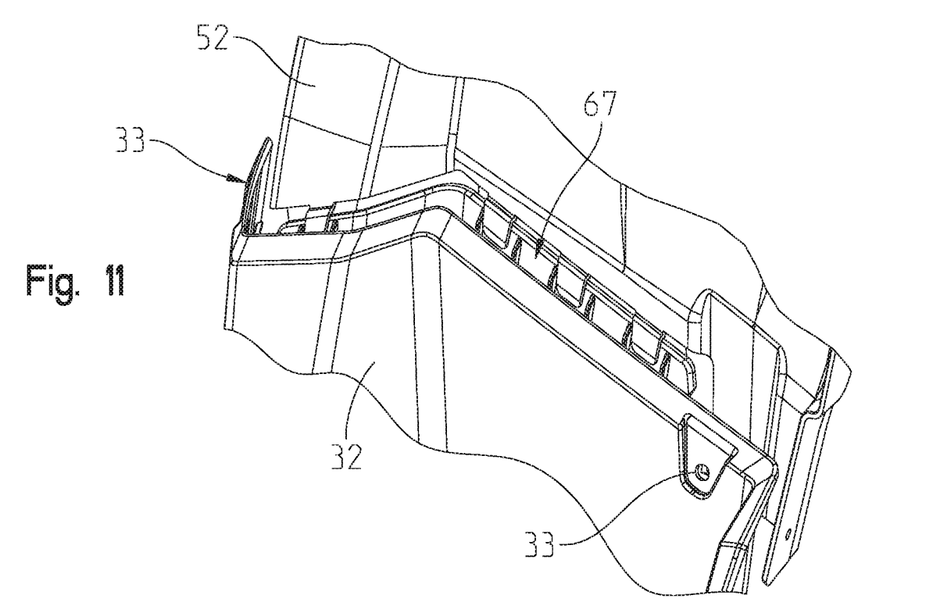
FIG. 11 is a detailed front view of a coupling between the liner and the fender body portion of FIG. 7.
Figure 12:
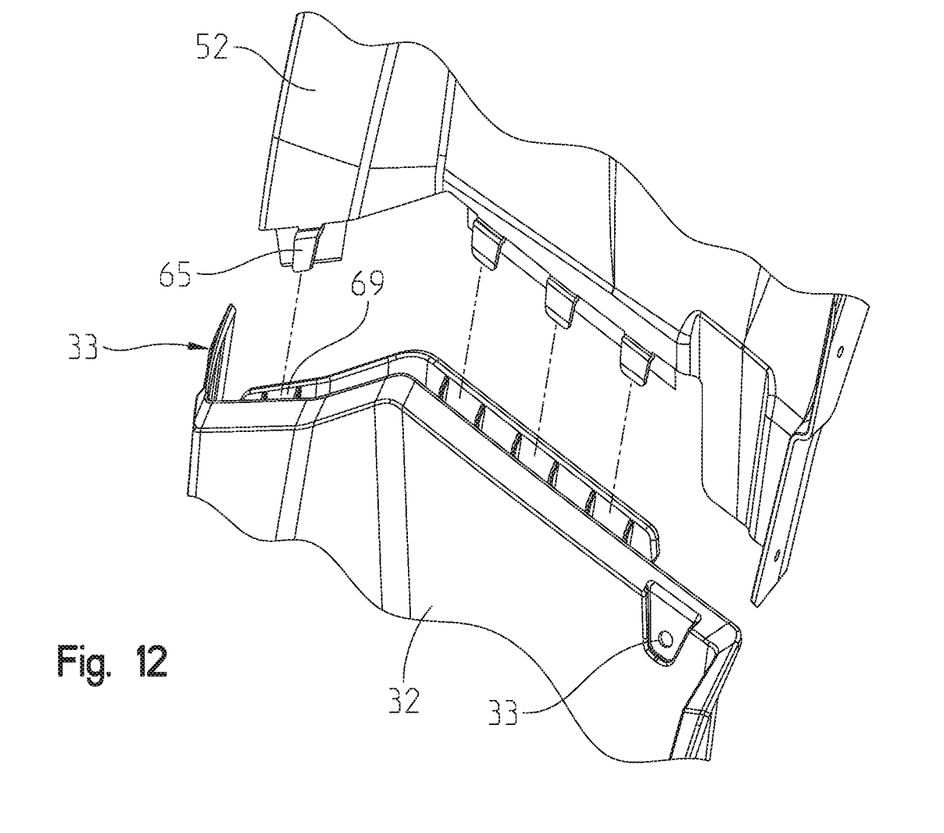
FIG. 12 is an exploded view of the coupling of FIG. 11.

With reference to FIGS. 10A and 10B, when liner 52 is coupled to body portion 38, an air gap 82 is created between liner 52 and body portion 38. Air gap 82 extends between body portion 38 and liner 52, with a portion of air gap 82 exposed along outer portion 64 of liner 52 and along a side portion of body portion 38. In various embodiments, air gap 82 has a width, W, that is approximately 5-10 millimeters wide. In an exemplary embodiment, air gap 82 is approximately 6 millimeters wide. Liner 52 and air gap 82 absorb heat and/or allow heat to dissipate and thus allow a reduction of approximately 10-15 degrees Centigrade at an upper or outer surface of body portion 38 (also known as user touch points) such that temperatures at the upper/outer surface of body portion 38 are at or below 66 degrees Centigrade. In various embodiments, the temperature at the upper/outer surface of body portion 38 may be at or below 66 degrees Centigrade if body portion 38 is made of rubber, at or below 60 degrees Centigrade if body portion 38 is made of plastic, or at or below 44 degrees Centigrade if body portion 38 is made of metal or a metal alloy. In this way, for the comfort of the rider, the rider is shielded from the heat produced by exhaust 15.

In various embodiments, air flow may be introduced to air gap 82 to allow further cooling to occur at the user touch points. For example, a fan may be provided to push cooler air through air gap 82, or an opening(s) may be provided in body portion 38 and/or fender body portions 32 to allow cooler air to flow through air gap 82 when ATV is operating. In various embodiments, the opening(s) in body portion 38 and/or fender body panels 32 may include air guides. Additional air flow through air gap 82 allows the surface of body portion 38 to be further cooled resulting in even lower temperatures at the user touch points.

Referring to FIGS. 6-9, liner 52 may further include an inlet or port 84 positioned along outer portion 64. Inlet 84 is configured to allow a rider or other persons (i.e., maintenance personnel) to clean out air gap 82 by flowing fluid through air gap 82. Inlet 84 is configured such that when liner 52 is coupled to body portion 38 a hose (not shown) may be received therein to push water, air and/or other fluids through air gap 68 to push or clear out any debris that may have entered air gap 82. In various embodiments, outer portion 64 includes an indented section 86 (see FIG. 7) spaced apart from a downward extending lip 88 of body portion 38. Inlet 84 is generally positioned along indented section 86 of outer portion 64. Lip 88 of body portion 38 is configured to protect or extend downward past inlet 84 such that debris cannot easily enter inlet 84, and the spacing between lip 88 and inlet 84 allows the hose to be received within inlet 84 without moving lip 88 (FIG. 10) or any part of body portion 38. In various embodiments, inlet 84 may have a threaded portion for receiving the end of the hose such that the user may push or clear out air gap 82 without having to hold the hose in place.

In general, liner 52 can be made of any material with high thermal properties (i.e., a melting point greater than 160 degrees Centigrade), for example, plastics with high deflection temperatures, nylon, thermosets, thermoplastic olefin, self-extinguishing grades of nylon, nylon with glass fillers, impact modified unfilled nylon, etc. In addition, in various embodiments, liner 52 may be overmolded with an aluminum shield to provide additional thermal protection.

It is within the scope of the present disclosure for similar liners with air gaps to be added in other various areas on vehicle, for example, along a side panel, at the front assembly, or any other area having a user touch point.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An off-road vehicle, comprising:
a frame;
a plurality of ground engaging members operably coupled to the frame;
a straddle seat supported by the frame and configured to support an operator;
an engine supported by the frame;
a body supported by the frame; and
a liner having a liner body coupled to the body, the liner configured to be positioned between the body and a heat source of the off-road vehicle, wherein an air gap extends from an inner surface of the liner body to an inner surface of the body, wherein an outer surface of the body defines an exterior surface of the off-road vehicle and an outer surface of the liner is adjacent the heat source.

2. The off-road vehicle of claim 1, wherein the liner includes a body and at least one tab.

3. The off-road vehicle of claim 2, wherein the body of the off-road vehicle includes at least one tab, the at least one tab of the liner being positioned between the at least one tab of the body and the frame.

4. The off-road vehicle of claim 1, wherein the liner includes an inlet configured to flow fluid through the air gap, the body including a lip spaced apart from the inlet and configured to protect the inlet, the lip extending downward past the inlet.

5. The off-road vehicle of claim 4, wherein the liner includes an indented portion along an outward facing edge of the liner, the inlet being positioned along the indented portion.

6. The off-road vehicle of claim 1, wherein the air gap is exposed along a side of the body and a side of the liner.

7. The off-road vehicle of claim 1, wherein the liner further includes a drip shield configured to route at least one of liquid and debris away from the heat source.

8. The off-road vehicle of claim 7, wherein the drip shield includes at least one flange and a spout.

9. The off-road vehicle of claim 1, wherein at least one heat shield is coupled to the liner.

10. The off-road vehicle of claim 9, wherein the at least one heat shield and the liner are formed of a single, unitary piece.

11. The off-road vehicle of claim 1, wherein the at least one heat shield is positioned between the liner and the heat source.

12. The off-road vehicle of claim 1, wherein the air gap is approximately 5-10 millimeters wide.

13. The off-road vehicle of claim 1, wherein the body and the liner are a single, unitary piece.

14. The off-road vehicle of claim 1, wherein the liner creates an inlet when coupled to the body.

15. A vehicle, comprising:
a frame;
a plurality of ground engaging members operably coupled to the frame;
an operator seat supported by the frame, the operator seat configured to support at least one user;
an engine supported by the frame; and
a body supported by the frame, the body having a first portion and a second portion, the first portion being spaced apart from the second portion in a configuration defining an air gap between the first portion and the second portion, the first portion defining a portion of an outer surface of the body, wherein the second portion includes an inlet configured to flow fluid through the air gap and the first portion includes a lip spaced apart from the inlet and configured to protect the inlet.

16. The vehicle of claim 15, wherein the second portion of the body is removably coupled to the first portion of the body.

17. The vehicle of claim 15, wherein the air gap between the first portion and the second portion is configured to allow temperatures at an upper surface of the body to be reduced to below 66 degrees Centigrade.

18. The vehicle of claim 15, wherein the first portion and the second portion are positioned adjacent an exhaust of the engine, the second portion being positioned between the exhaust and the first portion.

19. The vehicle of claim 15, wherein the lip extends downward past the inlet.

20. The vehicle of claim 15, wherein at least a portion of the second portion is positioned between the frame and at least a portion of the first portion.

21. An off-road vehicle, comprising:
a frame;
a plurality of ground engaging members operably coupled to the frame;
a straddle seat supported by the frame and configured to support an operator;
an engine supported by the frame;
a body supported by the frame, at least a portion of the body defining an exterior surface of the off-road vehicle; and
a liner coupled to the body and configured to be positioned between the body and a heat source of the off-road vehicle, wherein an air gap extends between the liner and the body, and the heat source has a longitudinal length and a lateral width, the liner extending continuously at least along the lateral width of the heat source.

22. The off-road vehicle of claim 21, wherein at least a portion of an outer surface of the body is adjacent the straddle seat and exposed to an external environment.

23. The off-road vehicle of claim 21, wherein the liner extends continuously along the longitudinal length of the heat source.

24. The off-road vehicle of claim 21, wherein the heat source is a muffler.

25. The off-road vehicle of claim 21, wherein the liner extends between the straddle seat and an outer edge of the off-road vehicle.

26. The off-road vehicle of claim 21, wherein a lateral width of the liner is different from a lateral width of the body.

27. The off-road vehicle of claim 21, wherein the liner includes an inlet, the inlet positioned along an indented section of the liner and extending away from the body.

* * * * *